(12) United States Patent
Patapoutian et al.

(10) Patent No.: US 7,342,734 B1
(45) Date of Patent: Mar. 11, 2008

(54) DISK DRIVES WITH RADIALLY ALIGNED SERVO BURST PATTERNS THAT GENERATE ORTHOGONAL CONTRIBUTIONS TO A READ SIGNAL AND RELATED DEMODULATORS AND METHODS

(75) Inventors: Ara Patapoutian, Hopkinton, MA (US); Michael Leis, Framingham, MA (US); Bruce Buch, Westborough, MA (US)

(73) Assignee: Maxtor Corporation, Longmont, CO (US)

( * ) Notice: Subject to any disclaimer, the term of this patent is extended or adjusted under 35 U.S.C. 154(b) by 165 days.

(21) Appl. No.: 11/011,998

(22) Filed: Dec. 14, 2004

Related U.S. Application Data

(60) Provisional application No. 60/606,846, filed on Sep. 2, 2004.

(51) Int. Cl.
*G11B 5/09* (2006.01)
(52) U.S. Cl. .................................. 360/29; 360/77.08
(58) Field of Classification Search .................... None
See application file for complete search history.

(56) References Cited

U.S. PATENT DOCUMENTS

| | | | |
|---|---|---|---|
| 5,923,492 A | 7/1999 | Liikanen | 360/77.08 |
| 5,966,264 A * | 10/1999 | Belser et al. | 360/77.08 |
| 6,157,511 A | 12/2000 | Liikanen | 360/77.08 |
| 6,256,160 B1 | 7/2001 | Liikanen et al. | 360/48 |
| 6,288,860 B1 * | 9/2001 | Buch | 360/48 |
| 6,433,950 B1 | 8/2002 | Liikanen | 360/77.08 |
| 6,452,990 B1 * | 9/2002 | Leis et al. | 360/27 |
| 6,515,812 B1 * | 2/2003 | Bergmans et al. | 360/48 |
| 7,027,257 B1 * | 4/2006 | Kupferman | 360/77.08 |
| 7,075,743 B2 * | 7/2006 | Nishida et al. | 360/48 |
| 2002/0150179 A1 * | 10/2002 | Leis et al. | 375/340 |

* cited by examiner

*Primary Examiner*—Andrea Wellington
*Assistant Examiner*—Varsha A Kapadia
(74) *Attorney, Agent, or Firm*—Myers Bigel Sibley & Sajovec, P.A.

(57) ABSTRACT

A disk drive includes a rotatable data storage disk, a transducer, an actuator, and a servo burst demodulator. The rotatable data storage disk includes a plurality of servo burst patterns thereon. The plurality of servo burst patterns are substantially radially aligned to each other, and radially adjacent ones of the servo burst patterns are configured to generate contributions to a read signal that are substantially orthogonal to each other. The transducer is configured to read the servo burst patterns on the disk to generate the read signal. The actuator is configured to position the transducer relative to the disk. The servo burst demodulator is configured to identify a separate contribution to the read signal from the radially adjacent servo burst patterns. The servo burst demodulator may be configured to generate transducer position information based on the identified separate contribution to the read signal from the radially adjacent servo burst patterns.

20 Claims, 6 Drawing Sheets

US 7,342,734 B1

DISK DRIVES WITH RADIALLY ALIGNED SERVO BURST PATTERNS THAT GENERATE ORTHOGONAL CONTRIBUTIONS TO A READ SIGNAL AND RELATED DEMODULATORS AND METHODS

RELATED APPLICATION

This application claims the benefit of and priority to U.S. Provisional Patent Application No. 60/606,846, filed Sep. 2, 2004, the disclosure of which is hereby incorporated herein by reference as if set forth in its entirety.

FIELD OF THE INVENTION

The present invention relates to disk based storage devices and, more particularly, to positioning transducers based on servo burst patterns on a disk.

BACKGROUND OF THE INVENTION

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The actuator arm assembly 18 also includes a voice coil motor 28 which moves the transducer 20 relative to the disk 12. The spin motor 14, and actuator arm assembly 18 are coupled to a number of electronic circuits 30 mounted to a printed circuit board 32. The electronic circuits 30 typically include a digital signal processor (DSP), a microprocessor-based controller and a random access memory (RAM) device.

Referring now to the illustration of FIG. 2, the disk stack 12 typically includes a plurality of data storage disks 34, each of which may have a pair of disk surfaces 36, 36. The disks 34 are mounted on a cylindrical shaft and are designed to rotate about axis 38. The spindle motor 14 as mentioned above, rotates the disk stack 12.

Referring now to the illustration of FIGS. 1 and 3, the actuator arm assembly 18 includes a plurality of the transducers 20, each of which correspond to one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Although the disk stack 12 is illustrated having a plurality of disks 34, it may instead contain a single disk 34, with the actuator arm assembly 18 having a corresponding single actuator arm 24.

FIG. 4 further illustrates one of the disks 34. Data is stored on the disk 34 within a number of concentric tracks 40 (or cylinders). Each track is divided into a plurality of radially extending spokes 42 on the disk 34. Each spoke 42 is further divided into a servo spoke 44 and a data spoke 46. The servo spokes 44 of the disk 34 are used to, among other things, accurately position the transducer 20 so that data can be properly written onto and read from the disk 34. The data spokes 46 are where non-servo related data (i.e., user data) is stored and retrieved. Such data, upon proper conditions, may be overwritten.

FIG. 5 illustrates portions of tracks 40 at radial locations n−1 to n+4, and which are drawn in a straight, rather than arcuate, fashion for ease of depiction. To accurately write data to and read data from the data spokes 46 of the disk 34, it is desirable to maintain the transducer 20 in a relatively fixed position with respect to a given data track's centerline 48 during each of the writing and reading procedures (called a track following operation).

To assist in controlling the position of the transducer 20 relative to the data track centerline 48, the servo spokes 44 can contain a servo preamble and servo burst patterns 50. The servo preamble can include a write/read (W/R) recovery field, an automatic gain control (AGC) field, a synchronization field, a spoke (sector) number field, and/or a cylinder number field. Fields of a servo spoke are illustrated in U.S. Pat. No. 6,256,160, which is incorporated herein by reference. Unlike information in the data spokes 46, the servo spokes 44 should not be overwritten or erased during normal operation of the disk drive 10.

The W/R recovery field can be used by the disk drive 10 to transition from writing data to a previous data track to reading information in the present servo spoke 44. The AGC field can be used to set a gain of the read/write channel of the disk drive 10. The synchronization field can be used to synchronize a clock so that spoke (sector) and cylinder number fields can be read, and so that the servo burst patterns 50 can be located. The spoke number field can be indicative of the circumferential position of the servo region with respect to the disk 34. The cylinder number field can be indicative of a radial location of the servo region.

The servo burst patterns 50 can include one or more groups of servo bursts, as is well-known in the art. A servo burst pattern 50 that includes first, second, third and fourth servo bursts A, B, C and D, respectively, are shown in FIG. 5. The servo bursts A, B, C, D are accurately positioned relative to each other.

During the manufacturing process of the disk drive 10, a servo-track writer ("STW") (not shown) can is used to write servo bursts A, B, C, D onto each of the servo spokes 44 of the disk 34. In FIG. 5, the distance (d) between each pair of horizontal grid lines represents ½ of the servo track pitch. Accordingly, each of the servo bursts A, B, C, D depicted in FIG. 5 spans a distance equal to the track pitch (or one track width). Additionally, as depicted in FIG. 5, the transducer 20 has a width approximately equal to one-half of the data track width. The transducer 20 is shown to be misaligned from the track centerline 48 of track n−1 to more clearly illustrate an example of its width.

As the transducer 20 is positioned over a track 40, it reads the servo information contained in the servo spokes 44 of the track 40 as a read signal, one servo spoke 44 at a time. The servo information contained in the read signal is used to generate position error signals as a function of the misalignment between the transducer 20 and the track centerline 48. The position error signals are provided to a servo controller that performs calculations and outputs a servo compensation signal which controls the voice-coil motor 28 to position the transducer 20 relative to the track centerline 48.

When the transducer 20 is positioned exactly over the centerline 48 of track n, approximately one-quarter of the A burst will be read followed by one-quarter of the B burst, and their amplitudes will be equal in the read signal. As the transducer 20 moves off-track (i.e., off of the track centerline), the amplitude of one burst will increase while the amplitude of the other burst will decrease, depending on the direction of misalignment. Accordingly, the radial position of the transducer 20 relative to the tracks can be determined based the servo information in the read signal from the servo bursts A, B, C, D.

FIG. 6 shows the servo burst patterns of FIG. 5 in more detail. The horizontal grid markings in FIG. 6 represent half-track spacings, while the vertical grid patterns represent burst cell times. Each of the servo bursts A, B, C, D includes a plurality of pulses which have a length of one burst cell time. Reference is made, for example, to pulses 60-74 of servo burst A between the centerlines of track n−1 and track n. Adjacent pulses (for example, pulse 60 and pulse 61) have magnetic domains that are inverted (i.e., 180 degrees out of phase from one another). The pulses with cross-hatching from the lower left to the upper right (e.g., 60, 62, 64, 66, 68, 70, 72, and 74) have a first polarity, while the pulses with cross-hatching from the upper left to the lower right (e.g., 61, 63, 65, 67, 69, 71, and 73) have a second polarity that is opposite to the first polarity.

SUMMARY OF THE INVENTION

In some embodiments of the present invention, a disk drive includes a rotatable data storage disk, a transducer, an actuator, and a servo burst demodulator. The rotatable data storage disk includes a plurality of servo burst patterns thereon. The plurality of servo burst patterns are substantially radially aligned to each other, and radially adjacent ones of the servo burst patterns are configured to generate contributions to a read signal that are substantially orthogonal to each other. The transducer is configured to read the servo burst patterns on the disk to generate the read signal. The actuator is configured to position the transducer relative to the disk. The servo burst demodulator is configured to identify a separate contribution to the read signal from the radially adjacent servo burst patterns. The servo burst demodulator may be configured to generate transducer position information based on the identified separate contribution to the read signal from the radially adjacent servo burst patterns.

The servo burst patterns may include at least three different types of servo burst patterns, which can be immediately adjacent to each other. Each type of servo burst pattern is configured to generate a contribution to the read signal that is orthogonal to the contribution to the read signal from the other types of servo burst patterns. The servo burst demodulator can include at least three matched filters. Each of the matched filters is configured to pass through the contribution to the read signal from a different one of the types of servo burst patterns and to substantially attenuate the contribution to the read signal from the other types of servo burst patterns.

In some other embodiments, the servo burst demodulator includes a buffer that is configured to at least temporarily hold the contributions to the read signal from the three different types of servo burst patterns. The filter is configured to sequentially output the contribution from a different one of the types of servo burst patterns to the read signal in the buffer. Moreover, the filter may consist of a single matched filter that is reused, with different filter coefficients, to sequentially output the contribution from the different types of servo burst patterns.

Each of the types of servo burst patterns may have a period that is different than the other types of servo burst patterns, and a length that is an integer multiple of the smallest period of the types of servo burst patterns. In some other embodiments of the types of servo burst patterns, they each include a different pseudo random data sequence.

In some other embodiments of the present invention, methods are provided for generating information on a position of a transducer that is adjacent to a rotatable disk in a disk drive. Contributions to a read signal that are substantially orthogonal to each other are generated from radially adjacent servo burst patterns that are substantially radially aligned to each other. A separate contribution to the read signal from the radially adjacent servo burst patterns is identified. Transducer position information is generated based on the identified separate contribution to the read signal from the radially adjacent servo burst patterns.

In some other embodiments of the present invention, a data storage disk includes at least first, second, and third servo burst patterns. The first servo burst pattern is configured to generate a first contribution to a read signal. The second servo burst pattern is configured to generate a second contribution to the read signal. The third servo burst pattern is configured to generate a third contribution to the read signal. The first, second, and third servo burst patterns are substantially radially aligned to each other, and are configured so that the first, second, and third contributions to the read signal are substantially orthogonal to each other.

The second servo burst pattern may be between, and immediately adjacent to, the first and third servo burst patterns. The disk may include a fourth servo burst pattern that is substantially radially aligned to the first, second, and third servo burst patterns, and that is configured to generate a fourth contribution to the read signal that is orthogonal to the first, second, and third contributions to the read signal. The third servo burst pattern may be between and immediately adjacent to the second and fourth servo burst patterns. The first and third servo burst patterns may be configured to generate the first and third contributions to the read signal about 180° out of phase with each other. The second and fourth servo burst patterns may be configured to generate the second and fourth contributions to the read signal about 180° out of phase with each other.

The first, second, and third servo burst patterns may be periodic with periods that are different relative to each other, and each may have a length that is an integer multiple of the smallest period of the first, second, and third servo burst patterns. The first, second, and third servo burst patterns may include a different pseudo random data sequence. The first, second, and third servo burst patterns may have a radial width of about a half of a radial width of data tracks on the disk.

DETAILED DESCRIPTION OF THE INVENTION

Figure 1:
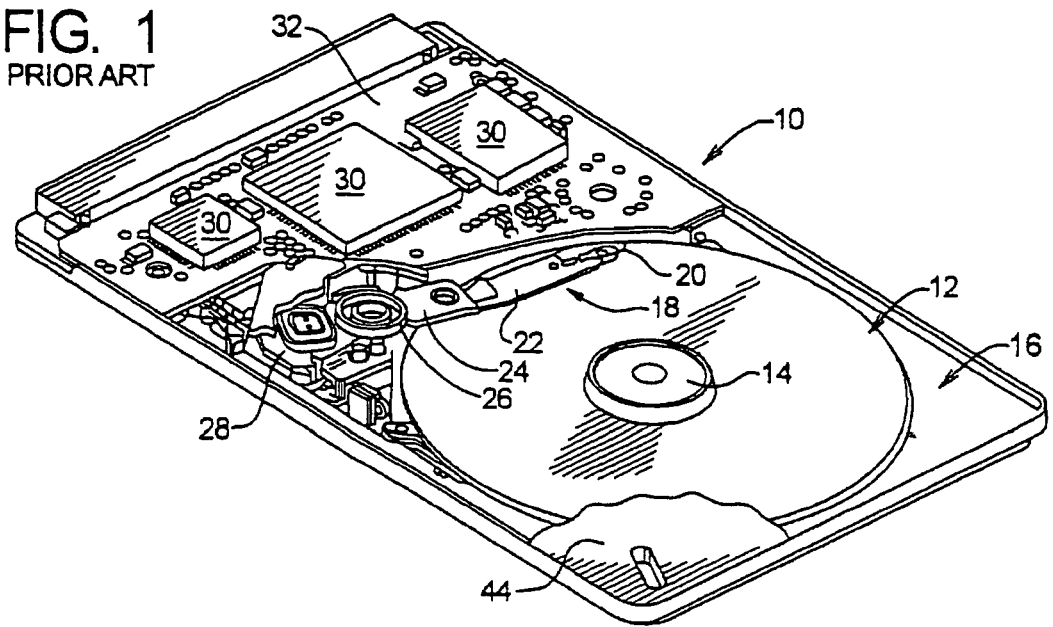
FIG. 1 is a perspective view of a conventional disk drive.
Figure 2:
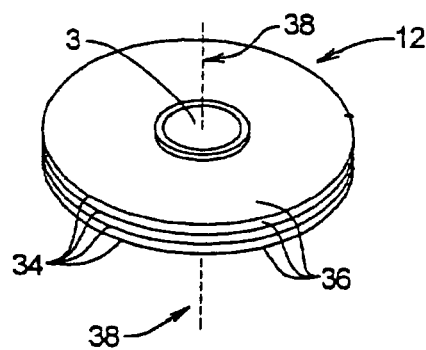
FIG. 2 is a perspective view of a conventional disk stack having a plurality of hard disks.
Figure 3:
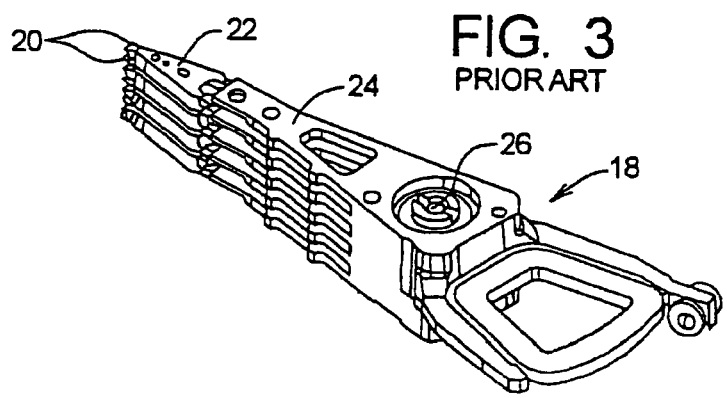
FIG. 3 is a perspective view of a portion of an actuator arm assembly having a plurality of actuator arms.

The present invention now will be described more fully hereinafter with reference to the accompanying drawings, in which embodiments of the invention are shown. However, this invention should not be construed as limited to the embodiments set forth wherein. Rather, these embodiments are provided so that this disclosure will be through and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. In the drawings, the size and relative sizes of regions may be exaggerated for clarity.

Some embodiments of the present invention can provide data storage disks, disk drives, servo burst demodulators, and methods. Accordingly, the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams, including operational flow charts, of data storage disks, disk drives, servo burst demodulators, and methods according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 4:
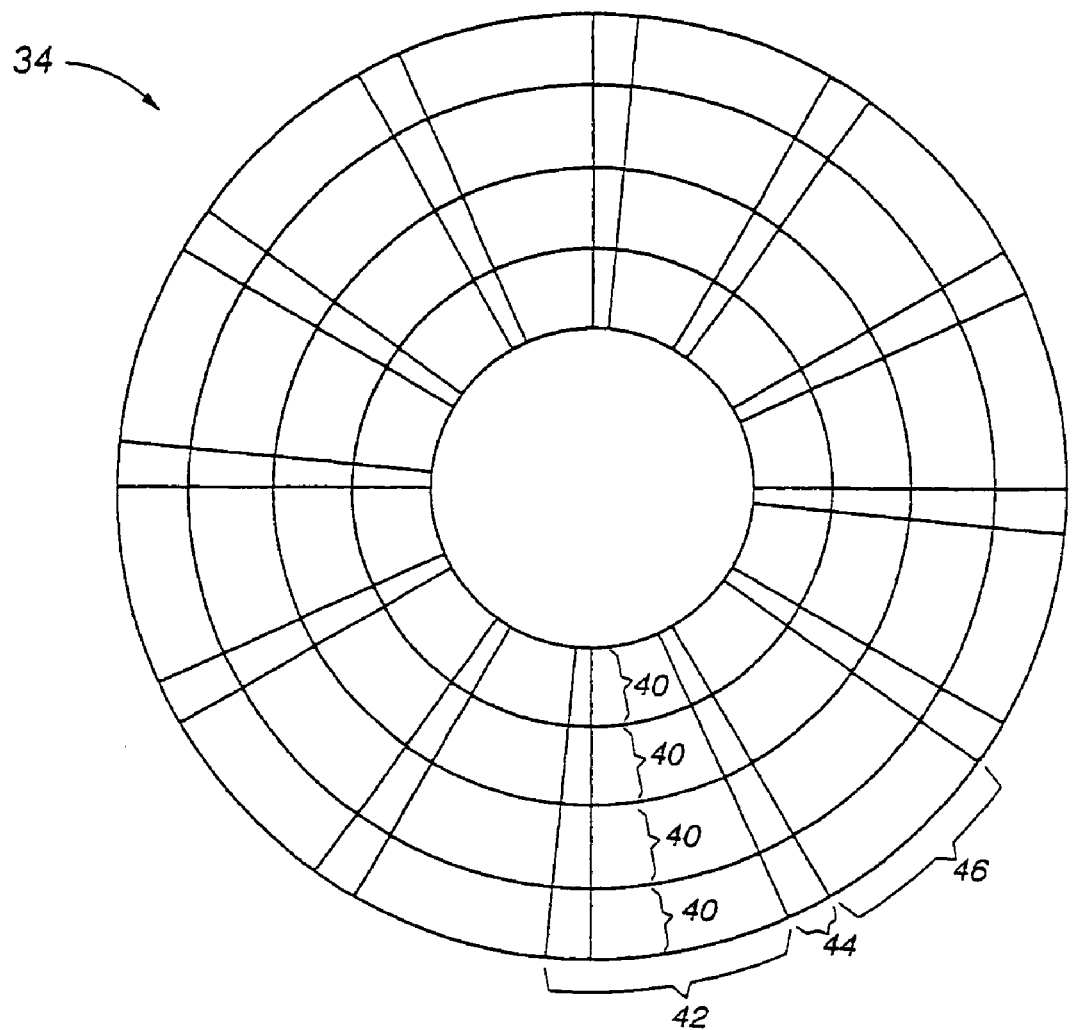
FIG. 4 is a top view of a conventional disk and illustrates tracks and spokes, with each of the spokes being divided into a servo spoke and a data spoke.
Figure 5:
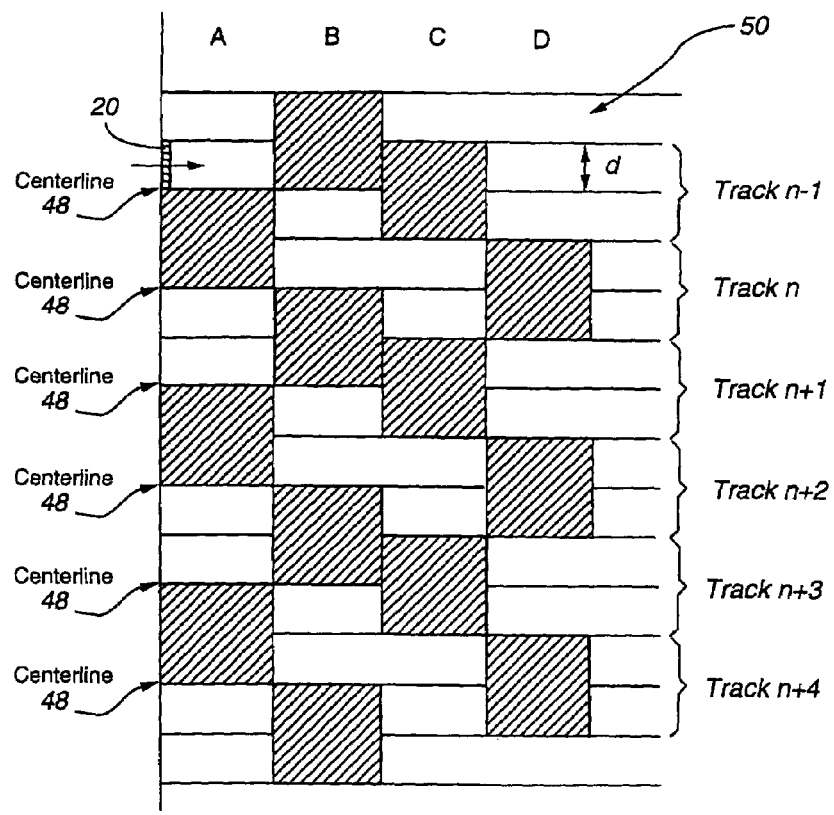
FIG. 5 is a top view of a portion of the disk of FIG. 4 that illustrate a conventional servo burst pattern.
Figure 6:
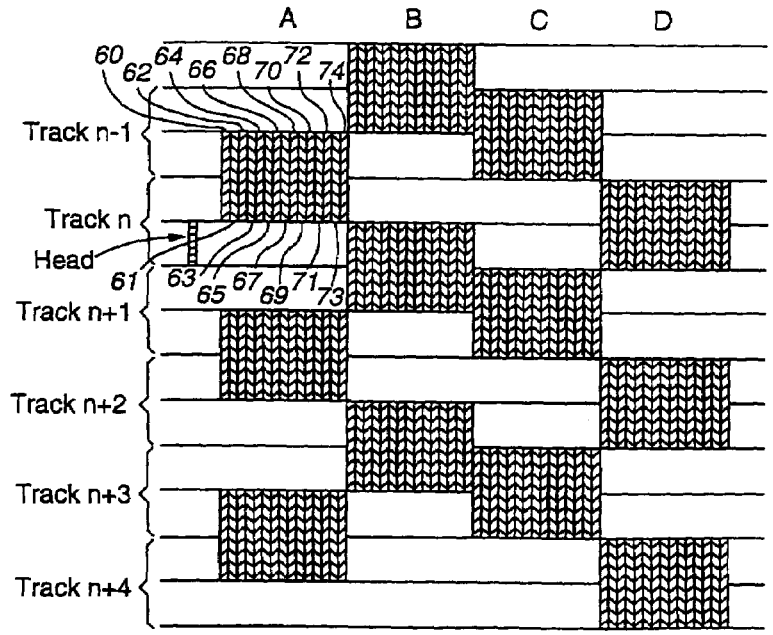
FIG. 6 illustrates in further detail the conventional servo burst pattern of FIG. 5.
Figure 7:
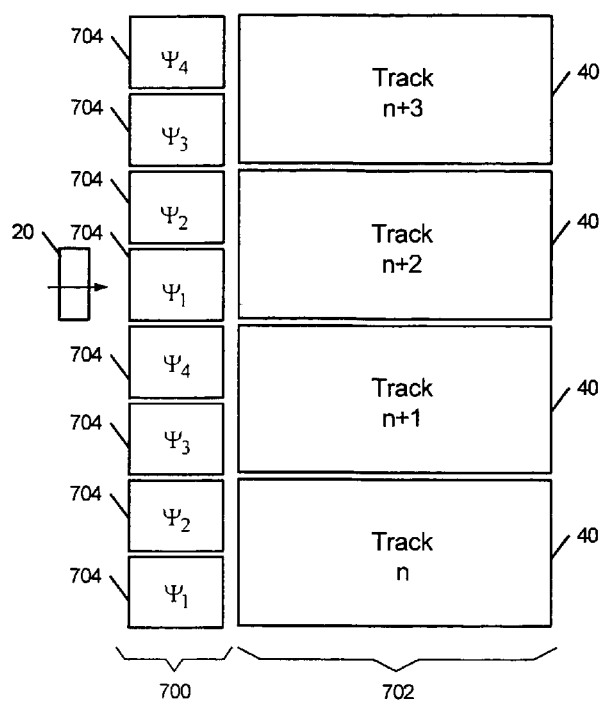
FIG. 7 illustrates servo burst patterns on a disk in accordance with some embodiments of the present invention.

FIG. 7 illustrates a portion of a servo spoke 700 and a portion of a data spoke 702 in accordance with some embodiments of the present invention, and which may reside in each of the spokes 42 of the disk 34 of FIG. 4. The data spoke 702 includes a plurality of tracks, illustrated at radial locations, n+3 to n. The servo spoke 700 includes a plurality of servo burst patterns 704. The servo burst patterns 704 are substantially radially aligned, and may be exactly radially aligned, to each other. Radially adjacent servo burst patterns 704 are configured to generate contributions to a read signal, when read by the transducer 20, that are substantially orthogonal, and may be exactly orthogonal, to each other. The contributions from the servo burst patterns 704 to the read signal can be exactly orthogonal to each other in that they have no cross correlation between them, and/or multiplying and adding any two of the servo burst patterns generates a result of zero. The servo burst patterns 704 may, for example, represent pseudorandom or pseudonoise (PN) binary sequences.

In the exemplary embodiment of the present invention shown in FIG. 7, the servo burst patterns 704 include four types $\Psi_1$, $\Psi_2$, $\Psi_3$, $\Psi_4$ of patterns. The four types $\Psi_1$, $\Psi_2$, $\Psi_3$, $\Psi_4$ of servo burst patterns 704 may each be configured to generate a contribution to the read signal that is substantially orthogonal with any contribution from the other types $\Psi_1$, $\Psi_2$, $\Psi_3$, $\Psi_4$ of the servo burst patterns 704. For example, the read signal may include a $\sin(f_1)$ component from the servo burst pattern type $\Psi_1$, a $\sin(f_2)$ component from the servo burst pattern type $\Psi_2$, a $\sin(f_3)$ component from the servo burst pattern type $\Psi_3$, and a $\sin(f_4)$ component from the servo burst pattern type $\Psi_4$, where $f_1$, $f_2$, $f_3$, and $f_4$ are orthogonal frequencies.

In a further example, when the transducer 20 passes across adjacent servo burst patterns of types $\Psi_1$ and $\Psi_2$ at the same time, the read signal includes a contribution from both of them. The contribution to the read signal from the servo burst pattern of type $\Psi_1$ is orthogonal to the contribution from the servo burst pattern of type $\Psi_2$. The separate contribution of the servo burst patterns 704 of types $\Psi_1$, $\Psi_2$, $\Psi_3$, $\Psi_4$ to the read signal is identified, and the position of the transducer 20 relative to the servo burst patterns 704 is determined based on the identified contributions to the read signal.

Figure 8:
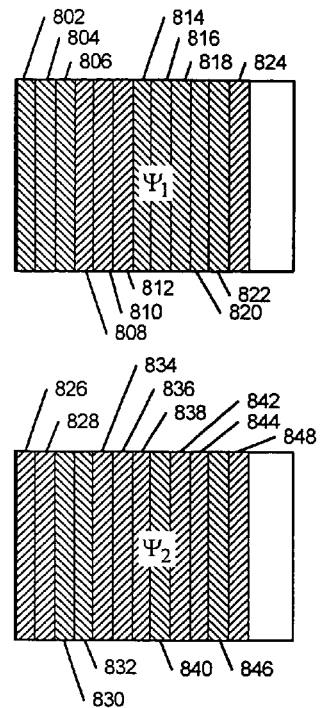
FIG. 8 illustrates in further detail a portion of two of the servo burst patterns of FIG. 7, in accordance with some embodiments of the present invention.

FIG. 8 illustrates in further detail a portion of two types $\Psi_1$, $\Psi_2$ of the servo burst patterns 704 of FIG. 7. The servo burst pattern types $\Psi_1$, $\Psi_2$ each include pulses. Reference is made, for example, to exemplary pulses 802-824 of servo burst pattern type $\Psi_1$, and exemplary pulses 826-848 of servo burst pattern type $\Psi_2$. The pulses with cross-hatching from upper left to the lower right (e.g., 802, 804, 806, 814, 816, 818, 824, 826, 828, 834, 836, 838, 842, 844, 848) have a first polarity, while the pulses with cross-hatching from lower left to the upper right (e.g., 808, 810, 812, 820, 822, 830, 832, 840, 846) have a second polarity that is opposite to the first polarity. Servo burst pattern type $\Psi_1$ has a different pattern of the pulses than servo burst pattern type $\Psi_2$. Accordingly, the read signal generated when by the transducer 20 passes over servo burst pattern type $\Psi_1$ is different than when it passes over servo burst pattern type $\Psi_2$. Moreover, when the transducer 20 passes over a portion of adjacent servo burst patterns of types $\Psi_1$, $\Psi_2$ at the same time, the read signal includes a contribution from both of them. The position of the transducer 20 relative to the servo burst pattern types $\Psi_1$, $\Psi_2$ can be determined based on their contributions to the read signal.

It is to be understood that the pulses and patterns in the servo burst patterns of types $\Psi_1$, $\Psi_2$ illustrated in FIG. 8 have been provided for purposes of illustration only. It is to be understood that the servo burst patterns 704 may be configured to have various different types of pulse patterns that generate a contribution to the read signal that is orthogonal to the contribution from adjacent servo burst patterns. For example, the pulse patterns may represent periodic data sequences or pseudo random data sequence. Accordingly, the servo burst pattern types $\Psi_1$, $\Psi_2$, $\Psi_3$, $\Psi_4$ can include different periodic data sequences or different pseudo random data sequence to generate orthogonal contributions to the read signal. Moreover, the width of the individual pulses may vary within one or more of the types of servo burst patterns. Different width pulses may be formed by, for example, imprinting them on the disk 34, and/or by writing the pulses on the disk 34 with a plurality of different frequency sources, such as within a STW.

The servo burst pattern types $\Psi_1$, $\Psi_2$, $\Psi_3$, $\Psi_4$ can be periodic with different periods relative to each other. The servo burst pattern types $T_1$, $\Psi_2$, $\Psi_3$, $\Psi_4$ can also have a length that is an integer multiple of the smallest period of the servo burst pattern types $\Psi_1$, $\Psi_2$, $T_3$, $\Psi_4$. For example, servo burst pattern type $\Psi_1$ can have a length of 4 T, servo burst pattern type $\Psi_2$ can have a length of 6 T, servo burst pattern type $\Psi_3$ can have a length of 8 T, and servo burst pattern type $\Psi_4$ can have a length of 12 T, where T can be the smallest period of the servo burst pattern types $\Psi_1$, $\Psi_2$, $\Psi_3$, $\Psi_4$. For example, the length of servo burst pattern types $\Psi_1$, $\Psi_2$, $\Psi_3$, $\Psi_4$ may be a multiple of 24 pulses.

The servo burst pattern types $\Psi_1$, $\Psi_2$, $\Psi_3$, $\Psi_4$ may be configured to have other lengths, which may be more easily written by a servo track writer, and/or which may provide an improved signal-to-noise ratio in the read signal. For example, the servo burst pattern types $\Psi_1$, $\Psi_2$, $\Psi_3$, $\Psi_4$ may be configured to have a multiple of 4.8 T, which may be formed by providing appropriate frequency synthesizer(s) in the STW. When the servo burst patterns have a length that is an integer multiple of the smallest period of the servo burst patterns 704, their separate contributions to the read signal may be closer to orthogonal than otherwise, and may compensate for some affects of phase differences between adjacent servo burst patterns 704 (e.g., radial incoherency).

Figure 9:
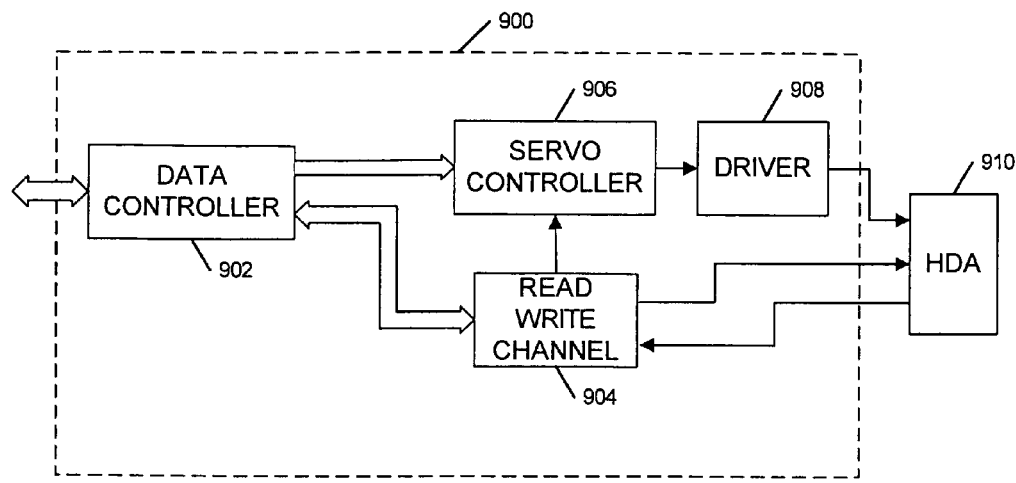
FIG. 9 is a block diagram of electronic circuits of a disk drive, such as the disk drive shown in FIG. 1, that are configured in accordance with some embodiments of the present invention.

Electronic circuits that may be used to determine the position of the transducer 20 relative to the servo burst patterns based on the separate contribution of the servo burst patterns to the read signal will now be further discussed with reference to FIGS. 9-11. FIG. 9 is a block diagram of electronic circuits 900 that are configured to position the transducer 20 based on the contribution of the orthogonal radially aligned servo burst patterns in accordance with some embodiments of the present invention. The electronic circuits 900 may be included within the electronic circuits 30 shown in FIG. 1. The electronic circuits 900 include a data controller 902, a read/write channel 904, a servo controller 906, and a driver 908, which communicates with a head disk assembly 910 (i.e., actuator arm assembly 18, VCM 28, and disk stack 12 of FIG. 1) to seek to and follow tracks on the disks 34, and to read/write from the tracks 40 thereon. The servo controller 906 is configured to operate in accordance with various embodiments of the present invention.

The data controller 902 may operate in a conventional manner to format data communicated between a host computer, or other external device, and the disks 34 through the read/write channel 902. The read/write channel 902 may operate in a conventional manner to convert data between the digital form used by the data controller 902 and the analog form used by the transducers 20. The read/write channel 904 also provides the read signal, which is generated by the transducer 20 reading the servo burst patterns on the disk 34, to the servo controller 906. The servo controller 906 uses the read signal to perform seek and track following operations of the transducer 20 relative to data tracks 40.

Figure 10:
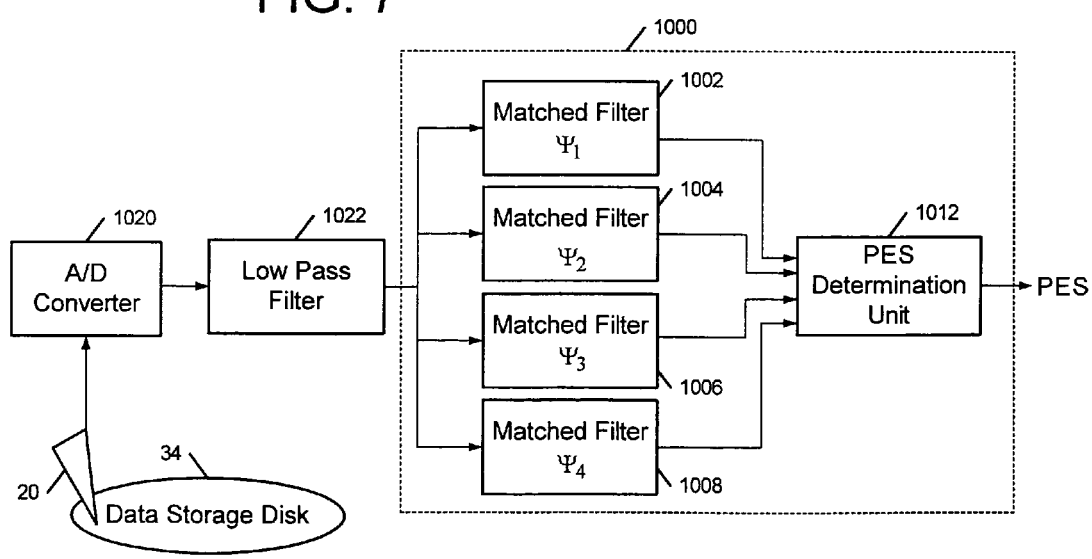
FIG. 10 is a block diagram of a servo burst demodulator within the electronic circuits of FIG. 9, which is configured to demodulate servo bursts in a read signal in accordance with some embodiments of the present invention.

FIG. 10 is a block diagram of a servo burst demodulator 1000 that can identify the separate contribution to the read signal from the four types $\Psi_1$, $\Psi_2$, $\Psi_3$, $\Psi_4$ of servo burst patterns 704 shown in FIG. 7, in accordance with some embodiments of the present invention. The servo burst demodulator 1000 may be at least partially within, for example, the servo controller 906 and/or the read write channel 904. The transducer 20 reads the servo burst patterns on the disk 34 to generate the read signal. The read signal may be converted to a digital signal by an analog-to-digital converter 1020, and/or it may be filtered by a low pass filter 1022 to reduce noise in the signal before it is provided to the servo burst demodulator. The read signal can be represented by the following equation:

$$y = \alpha_1 \Psi_1 + \alpha_2 \Psi_2 + \alpha_3 \Psi_3 + \alpha_4 \Psi_4 + \text{noise}$$

where y is the read signal; $\Psi_1$, $\Psi_2$, $\Psi_3$, $\Psi_4$ are the different types of orthogonal servo burst patterns 704; and $\alpha_1$, $\alpha_2$, $\alpha_3$, $\alpha_4$ is the overlap of the transducer 20 with the corresponding types of servo burst patterns 704.

The servo burst demodulator includes four matched filters 1002, 1004, 1006, 1008 that are configured to pass through, as an output therefrom, a component of the read signal that is from a different one of servo burst pattern types $\Psi_1$, $\Psi_2$, $\Psi_3$, $\Psi_4$ and to substantially attenuate any components of the read signal that are from other servo burst pattern types $\Psi_1$, $\Psi_2$, $\Psi_3$, $\Psi_4$. For example, matched filter 1002 is configured to pass through, as an output therefrom, the component of the read signal from servo burst pattern type $\Psi_1$ and to substantially attenuate any components of the read signal from the other servo burst pattern types $\Psi_2$, $\Psi_3$, $\Psi_4$. Similarly, matched filter 1004 passes any component from servo burst pattern type $\Psi_2$ and substantially attenuates any component from servo burst pattern types $\Psi_1$, $\Psi_3$, $\Psi_4$. Matched filter 1006 passes any component from servo burst pattern type $\Psi_3$ and substantially attenuates any component from servo burst pattern types $\Psi_1$, $\Psi_2$, $\Psi_4$, and matched filter 1008 passes any component from servo burst pattern type $\Psi_4$ and substantially attenuates any component from servo burst pattern types $\Psi_1$, $\Psi_2$, $\Psi_3$.

The output from the matched filters 1002, 1004, 1006, 1008 represent estimates of an amount of overlap of the transducer 20 and the servo burst pattern types $\Psi_1$, $\Psi_2$, $\Psi_3$, $\Psi_4$. The estimates that are output by the matched filters 1002, 1004, 1006, 1008 are respectively referred to as $\hat{\alpha}_1$, $\hat{\alpha}_2$, $\hat{\alpha}_3$, $\hat{\alpha}_4$. Each of the matched filters 1002, 1004, 1006, 1008 may include a pair of in-phase and quadrature filters that are matched to a component of the read signal from a respective one of the servo burst pattern types $\Psi_1$, $\Psi_2$, $\Psi_3$, $\Psi_4$. Each of the estimates $\hat{\alpha}_1$, $\hat{\alpha}_2$, $\hat{\alpha}_3$, $\hat{\alpha}_4$ may then be determined from a square root of the sum of the squares of the output from the in-phase and quadrature filters of a respective one of the matched filters 1002, 1004, 1006, 1008.

The estimates $\hat{\alpha}_1$, $\hat{\alpha}_2$, $\hat{\alpha}_3$, $\hat{\alpha}_4$ are provided to a PES determination unit 1012. The PES determination unit determines a location of the transducer 20 relative to the adjacent servo burst patterns 704 ("transducer_position") by, for example, taking an arctangent of the following combination of the estimates $\hat{\alpha}_1$, $\hat{\alpha}_2$, $\hat{\alpha}_3$, $\hat{\alpha}_4$:

$$\text{transducer\_position} = \arctan\left(\frac{\hat{\alpha}_2 - \hat{\alpha}_4}{\hat{\alpha}_1 - \hat{\alpha}_3}\right).$$

The PES determination unit 1012 can output a position error signal PES that can be used by the servo controller 906 of FIG. 9 to position the transducer 20 relative to the tracks 40 in the data spoke 702 of FIG. 7.

Although four different types of servo burst patterns have been shown in FIG. 7 for purposes of illustration, it is to be understood that two or more different orthogonal types of servo burst patterns may be provided in the servo spoke 700. However, it is noted that when transducer position is determined from an arctangent of the component estimates $\hat{\alpha}$, such as explained herein, then three or more different orthogonal types of servo burst patterns may be used to determine both the value and sign of the estimates $\hat{\alpha}$. The number of matched filters in the servo burst demodulator 1000 (FIG. 8) may vary with the number of different types of servo burst patterns. For example, three matched filters may be used to identify the contribution of three different types of servo burst patterns to the read signal, and five matched filters may be used to identify the contribution from five different types of servo burst patterns.

For N different orthogonal types of servo burst patterns, the position of the transducer 20 ("transducer_position") relative to the servo burst patterns can be determined from the estimates $\hat{\alpha}$, output from the filters, by the following equation:

$$\text{transducer\_position} = \arctan\left(\frac{y}{x}\right),$$

where $$y = \sum_{i=0}^{N-1} \sin\left(\frac{2\pi i}{N}\right)\hat{\alpha}_i \quad \text{and} \quad x = \sum_{i=0}^{N-1} \cos\left(\frac{2\pi i}{N}\right)\hat{\alpha}_i.$$

According to another embodiment of the present invention, some of the types $\Psi_1$, $\Psi_2$, $\Psi_3$, $\Psi_4$ of servo burst patterns 704 shown in FIG. 7 are phase shifted 180° relative to other of the servo burst pattern types $\Psi_1$, $\Psi_2$, $\Psi_3$, $\Psi_4$. For example, servo burst pattern type $\Psi_1$ can be 180° out-of-phase with servo burst pattern type $\Psi_3$, and servo burst pattern type $\Psi_2$ can be 180° out-of-phase with servo burst pattern type $\Psi_4$. In a further example, the contribution to the read signal from the servo burst pattern of types $\Psi_1$, $\Psi_2$, $\Psi_3$, $\Psi_4$ can respectively be represented by $\sin(f_1)$, $\sin(f_2)$, $-\sin(f_1)$ and $-\sin(f_2)$.

When servo burst pattern type $\Psi_1$ is 180° out-of-phase with servo burst pattern type $\Psi_3$, and servo burst pattern type $\Psi_2$ is 180° out-of-phase with servo burst pattern type $\Psi_4$, two matched filters may be used to separate the contributions of the four servo burst pattern types $\Psi_1$, $\Psi_2$, $\Psi_3$, $\Psi_4$ to the read signal. For example, one of the matched filters can output $\hat{\alpha}_1 - \hat{\alpha}_3$, and the other matched filter can output $\hat{\alpha}_2 - \hat{\alpha}_4$. Accordingly, the PES determination unit 1012 can determine a location of the transducer 20 relative to the adjacent servo burst patterns 704 from an arctangent of the ratio of the output of one matched filter over the output of the other matched filter, such as shown by the equation below:

$$\text{transducer\_position} = \arctan\left(\frac{\hat{\alpha}_2 + \hat{\alpha}_4}{\hat{\alpha}_1 + \hat{\alpha}_3}\right).$$

More generally, for N different types of servo burst patterns (having pairs that are 180° out-of-phase), where N is an even number, the position of the transducer 20 ("transducer_position") relative to the servo burst patterns can be determined from the estimates $\hat{\alpha}$, output from the filters, by the following equation:

$$\text{transducer\_position} = \arctan\left(\frac{y}{x}\right),$$

where $$y = \sum_{i=0}^{N-1} \sin\left(\frac{\pi i}{N}\right)\hat{\alpha}_i \quad \text{and} \quad x = \sum_{i=0}^{N-1} \cos\left(\frac{\pi i}{N}\right)\hat{\alpha}_i.$$

Accordingly, N/2 matched filters may be used to separate the contributions of the types of servo burst patterns for use by the PES determination unit 1012. Consequently, out-of-phase pairs of servo burst patterns may be used to reduce the number of matched filters which are used in the servo burst demodulator 1000.

Figure 11:
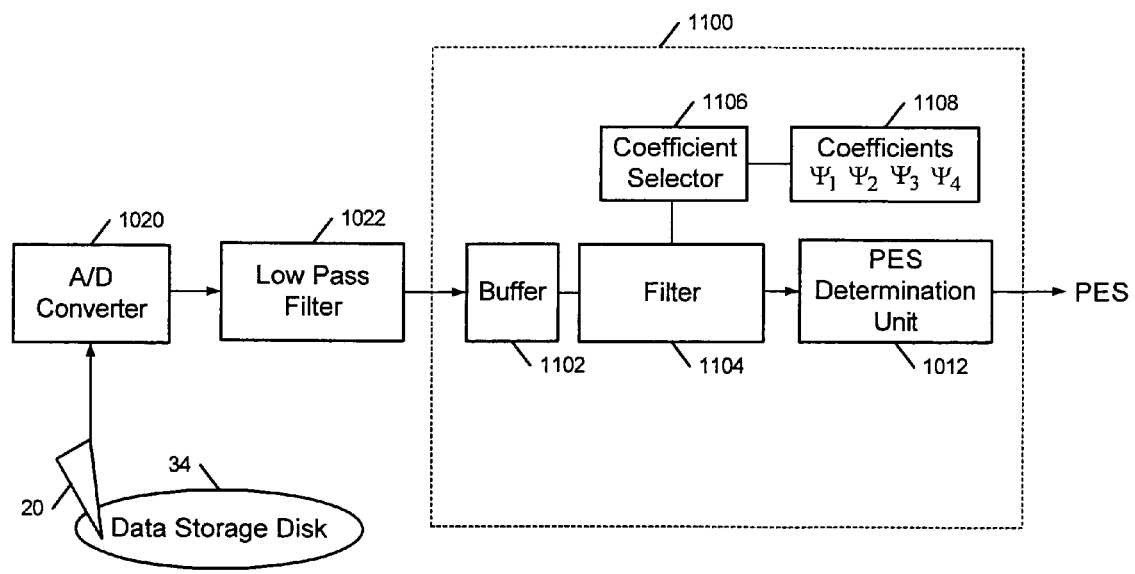
FIG. 11 is a block diagram of a servo burst demodulator within the electronic circuits of FIG. 9, which is configured to demodulate servo bursts in a read signal in accordance with some other embodiments of the present invention.

FIG. 11 is a block diagram of a servo burst demodulator 1100 according to another embodiment of the present invention. The servo burst demodulator 1100 includes a buffer 1102, a filter 1104, a coefficient selector 1106, and a plurality of coefficients 1108. In contrast to the demodulator 1000 of FIG. 10, the demodulator 1100 of FIG. 11 uses a single filter to separate the components of the read signal from the different types of servo burst patterns. The demodulator 1100 can receive a digitized and low pass filtered read signal from the analog-to-digital converter 1020 and low pass filter 1022, as was explained with regard to FIG. 10. The demodulator 1100 buffers the read signal in a buffer 1102. The filter 1104 sequentially separates out from the read signal in the buffer 1102 the separate components from the servo burst pattern types $\Psi_1$, $\Psi_2$, $\Psi_3$, $\Psi_4$. More particularly, the filter 1104 filters the buffered read using coefficients that are tuned a first one of the servo burst pattern types $\Psi_1$, $\Psi_2$, $\Psi_3$, $\Psi_4$. The filter 1104 then filters the buffered read using coefficients that are tuned a second one of the servo burst pattern types $\Psi_1$, $\Psi_2$, $\Psi_3$, $\Psi_4$. The filter 1104 repeats the filtering of the buffered read data using coefficients that are tuned to a third, and then a fourth, one of the servo burst pattern types $\Psi_1$, $\Psi_2$, $\Psi_3$, $\Psi_4$. The coefficient selector 1106 selects and provides the coefficients to the filter 1104 for each filtering repetition.

The filter 1104 outputs the separate components of the read signal to the PES determination unit 1012, that can determine the position of the transducer 20 with respect to the servo burst patterns 704 by the operations described above.

Figure 12:
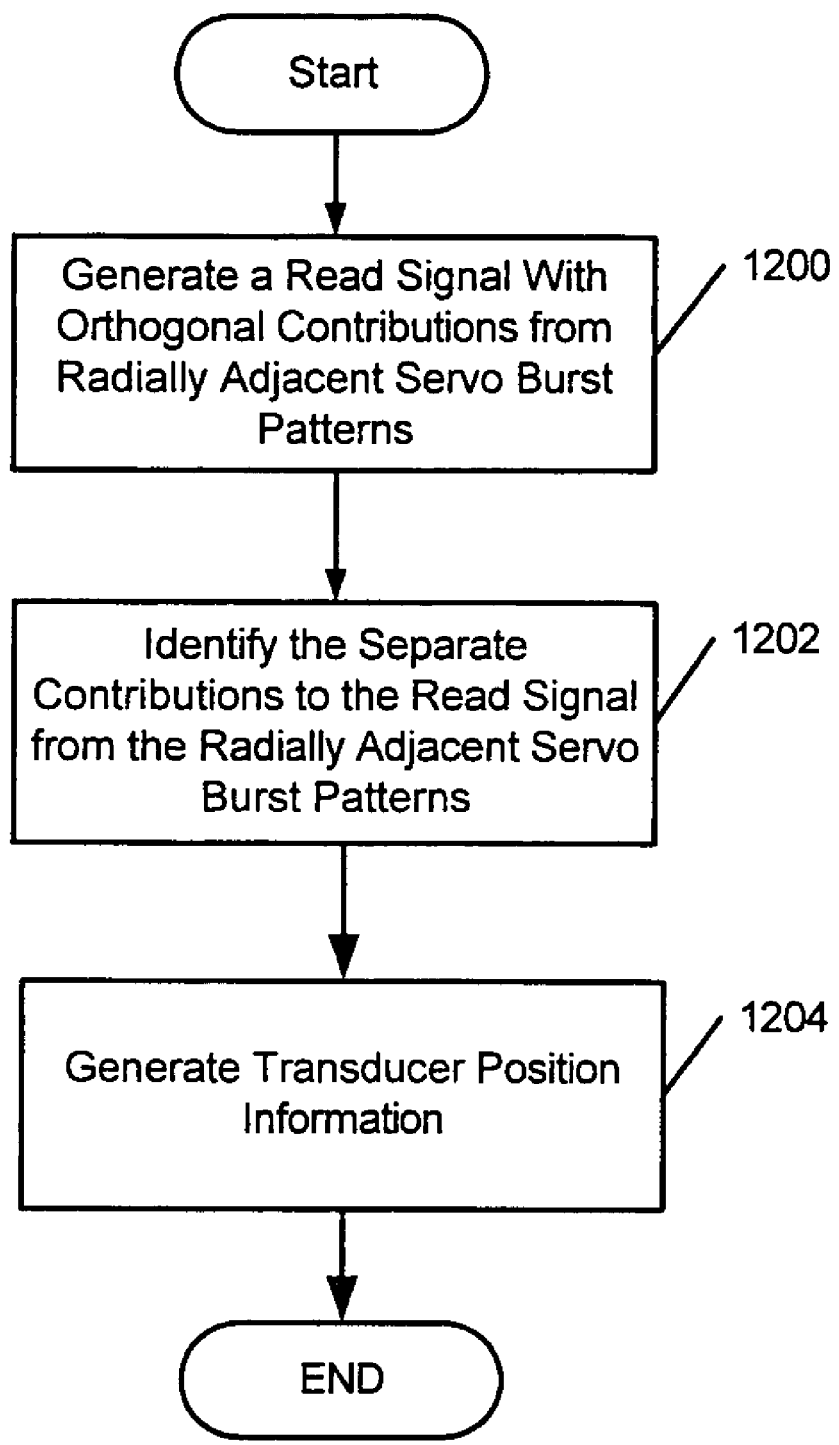
FIG. 12 illustrates a flowchart of operations for generating information on the position of a transducer in accordance with some embodiments of the present invention.

FIG. 12 illustrates a flowchart of operations for generating information on the position of the transducer 20, in accordance with some embodiments of the present invention. At Block 1200, a read signal is generated that may contain contributions from radially adjacent servo burst patterns.

The read signal is generated by the transducer 20 reading servo burst patterns that are configured in accordance with at least one embodiment of the present invention. At Block 1202, the separate contributions to the read signal from the radially adjacent servo burst patterns are identified. At Block 1204, transducer position information is generated from the identified contributions to the read signal from the radially adjacent servo burst patterns. As can be appreciated, the operations of Blocks 1202 and 1204 may be carried out by the servo controller 906 shown in FIG. 9, and the servo burst demodulators 1000, 1100 shown in FIGS. 10 and 11 in accordance with some embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A data storage disk comprising:
    a first servo burst pattern that is configured to generate a first contribution to a read signal;
    a second servo burst pattern that is configured to generate a second contribution to the read signal;
    a third servo burst pattern that is configured to generate a third contribution to the read signal, wherein the first, second, and third servo burst patterns are substantially radially aligned to each other, and are configured so that each of the first, second, and third contributions to the read signal is orthogonal to the other two contributions to the read signal.

2. The data storage disk of claim 1, wherein the second servo burst pattern is between and immediately adjacent to the first and third servo burst patterns.

3. The data storage disk of claim 1, further comprising a fourth servo burst pattern that is substantially radially aligned to the first, second, and third servo burst patterns, and wherein the fourth servo burst pattern is configured to generate a fourth contribution to the read signal that is orthogonal to the first, second, and third contributions to the read signal.

4. The data storage disk of claim 3, wherein the third servo burst pattern is between and immediately adjacent to the second and fourth servo burst patterns.

5. The data storage disk of claim 4, wherein:
    the first and third servo burst patterns are configured to generate the first and third contributions to the read signal about 180° out of phase with each other; and
    the second and fourth servo burst patterns are configured to generate the second and fourth contributions to the read signal about 180° out of phase with each other.

6. The data storage disk of claim 3, further comprising at least one more servo burst pattern that is substantially radially aligned to the first, second, third, and fourth servo burst patterns, and wherein each of the at least one more servo burst pattern is configured to generate a contribution to the read signal that is orthogonal to the first, second, third, and fourth contributions to the read signal.

7. The data storage disk of claim 3, wherein the first, second, third, and fourth servo burst patterns form a group of servo burst patterns, and a plurality of the group of servo burst patterns are substantially radially aligned and adjacent to each other in a servo sector of the disk.

8. The data storage disk of claim 1, wherein the first, second, and third servo burst patterns are periodic with different periods relative to each other and each have a length that is an integer multiple of the smallest period of the first, second, and third servo burst patterns so that the first, second, and third servo burst patterns are orthogonal to each other.

9. The data storage disk of claim 8, further comprising a fourth servo burst pattern that is substantially radially aligned to the first, second, and third servo burst patterns, and wherein:
    the first servo burst pattern has a length of 4 T;
    the second servo burst pattern has a length of 6 T;
    the third servo burst pattern has a length of 8 T;
    the fourth servo burst pattern is configured to generate a fourth contribution to the read signal that is orthogonal to the first, second, and third contributions to the read signal, has a period that is different than the periods of the first, second, and third servo burst patterns, and has a length of 12 T; and
    T is the smallest of the periods of the first, second, third, and fourth servo burst patterns.

10. The data storage disk of claim 1, wherein each of the first, second, and third servo burst patterns comprise a different pseudo random data sequence that is orthogonal to one another.

11. The data storage disk of claim 1, further comprising a plurality of data tracks, wherein the first, second, and third servo burst patterns have a radial width of about a half of a radial width of the data tracks.

12. A disk drive comprising:
    a rotatable data storage disk comprising at least first, second, and third servo burst patterns thereon, wherein the first, second, and third servo burst patterns are substantially radially aligned to each other, and each of the first, second, and third servo burst patterns is configured to generate a contribution to a read signal that is orthogonal to the other two servo burst patterns;
    a transducer that is configured to read the servo burst patterns on the disk to generate the read signal;
    an actuator that is configured to position the transducer relative to the disk; and
    a servo burst demodulator that is configured to identify a separate contribution to the read signal from the radially adjacent servo burst patterns.

13. The disk drive of claim 12, wherein the servo burst demodulator is configured to generate transducer position information based on the identified separate contribution to the read signal from the radially adjacent servo burst patterns.

14. The disk drive of claim 12, wherein the servo burst demodulator comprises at least three matched filters, each of the matched filters is configured to pass through the contribution to the read signal from a different one of the at least first, second, and third servo burst patterns and to substantially attenuate the contribution to the read signal from the other ones of the first, second, and third servo burst patterns.

15. The disk drive of claim 12, the servo burst demodulator comprises a buffer and a filter, the buffer is configured to at least temporarily hold the contributions to the read signal from the first, second, and third servo burst patterns, and the filter is configured to sequential output the contribution from a different one of the first, second, and third servo burst patterns to the read signal in the buffer.

16. The disk drive of claim 12, wherein the at least first, second, and third servo burst patterns are immediately adjacent to each other.

17. The disk drive of claim 12, wherein each of the of first, second, and third servo burst patterns has a period that is different than the other two servo burst patterns and a length that is an integer multiple of the smallest period of the first, second, and third servo burst patterns so that each of the first, second, and third servo burst patterns is orthogonal to the other two servo burs patterns.

18. The disk drive of claim 12, wherein each of the first, second, and third servo burst patterns comprises a different pseudo random data sequence that is orthogonal to the other two servo burst patterns.

19. A method of generating information on a position of a transducer that is adjacent to a rotatable disk in a disk drive, the method comprising:

generating contributions to a read signal from at least first, second, and third radially adjacent servo burst patterns that are substantially radially aligned to each other and each of the first, second, and third servo burst patterns generate a contribution to the read signal that is orthogonal to the other two servo burst patterns;

identifying a separate contribution to the read signal from the radially adjacent first, second, and third servo burst patterns; and generating transducer position information based on the identified separate contribution to the read signal from the radially adjacent first, second, and third servo burst patterns.

20. The method of claim 19, wherein:

identifying a separate contribution to the read signal from the radially adjacent servo burst patterns comprises separating the contributions to the read signal from the radially adjacent servo burst patterns; and generating transduction position information comprising determining transducer position information based on an arctangent of a combination of the separated contributions to the read signal from the radially adjacent servo burst patterns.

\* \* \* \* \*